United States Patent [19]

Paar et al.

[11] Patent Number: 4,684,702

[45] Date of Patent: Aug. 4, 1987

[54] CATHODICALLY DEPOSITABLE SYNTHETIC RESIN BINDERS AND PROCESS FOR PRODUCING SAME

[75] Inventors: Willibald Paar; Georg Pampouchidis; Helmut Hönig, all of Graz, Austria

[73] Assignee: Vianova Kunstharz, A.G., Werndorf, Austria

[21] Appl. No.: 593,268

[22] Filed: Mar. 26, 1984

[30] Foreign Application Priority Data

Mar. 28, 1983 [AT] Austria .................................. 1070/83

[51] Int. Cl.[4] ........................................... C08F 283/00
[52] U.S. Cl. ..................................... 525/528; 525/529
[58] Field of Search ................................. 525/528, 529

[56] References Cited

U.S. PATENT DOCUMENTS 4,349,655  9/1982  Leitner et al. ......................... 528/45

Primary Examiner—John C. Bleutge
Assistant Examiner—A. Carrillo
Attorney, Agent, or Firm—A. W. Breiner

[57] ABSTRACT

Cathodically depositable self-crosslinking binders for electrodeposition having a substantially water-insoluble component which is a derivative of a dioxazolidine which carries chain-end or side-chain unsaturated double bonds are described. The binders have favorable wetting properties and emulsifying characteristics, as well as excellent film characteristics in the finished coatings.

20 Claims, No Drawings

CATHODICALLY DEPOSITABLE SYNTHETIC RESIN BINDERS AND PROCESS FOR PRODUCING SAME

The present invention is directed to cathodically depositable binder combinations for electrodeposition coatings (CED) based on a derivative of a dioxazolidine which carries chain-end or side-chain unsaturated double bonds, and to a process of producing the binders.

Cathodically depositable binder combinations containing a water-dilutable main component which is hardenable through thermal polymerization, a second component carrying chain-end double bonds, optionally also carrying basic nitrogen atoms which are water-insoluble under the conditions of cathodic electrodeposition are described in AT-PS No. 346 989 and AT-PS No. 353 369. The preferred products are reaction products of epoxy resins. The water-insoluble component is designed to convey to the binder the character of an emulsion, thus enhancing and monitoring some film properties, such as film formation, throwing power, and surface quality. With this component, polymerizable chain-end or side-chain double bonds can be introduced into the system, as well as other molecular segments which can influence film performance. EP No. 00 28 401 or AT-PS No. 365 214, and references not yet in the public domain, describe cationic water-dilutable binders carrying oxazolidine groups which are used either as the sole binder or, due to their excellent wetting properties, as mill base for the preparation of pigment pastes for cationic binders.

It has now been found that cationic binders with excellent properties are obtained, if, as the substantially water-insoluble component of water-dilutable cathodically depositable and self-crosslinking binders, a derivative of a dioxazolidine is used which carries chain-end or side-chain unsaturated double bonds.

Accordingly, the present invention is concerned with a process for producing cathodically depositable synthetic resin binders, hardenable through thermal polymerization containing component (A) which is substantially water-soluble upon protonation of the basic groups, carrying basic nitrogen atoms so as to provide an amine number of from between 40 and 170 mg KOH/g and chain-end or side-chain double bonds so as to provide a double bond number of at least 0.5, preferably of from about 0.8 to 2.5 for 1000 molecular weight units, and component (B) which is substantially water-insoluble under the conditions of cathodic electrodeposition, characterized in that as component (B) a modified dioxazolidine compound and/or a di-perhydro-1,3-oxazine compound is used which carries the moiety

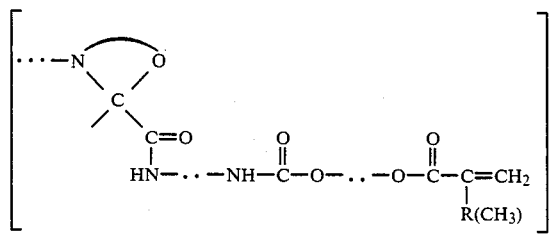

2 or 3 the moiety

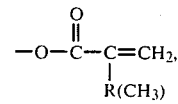

as an average, being present at least once per molecule. In the formula R is hydrogen or $CH_3$.

Due to the structure and the functional groups, the use of these materials in cathodically depositable systems (CED) provides various advantages. Thus, through the favorable wetting properties and the excellent emulsifying effect of this component, it is not necessary to use a mill base resin, since component (B) acts as such. Furthermore, the composition of this component according to the present invention offers a variety of possibilities to influence the composition and the formation of the film. A further, now unessential advantage of the new auxiliary components is their positive influence on the viscosity of the binder systems prior to and during the dilution with water to the desired solids content for application. The effect of reducing the viscosity and, thus, the possibility of lowering the content of organic solvents in CED systems is gaining momentum, as can be seen from VOC (volatile organic compounds) provisions in the United States.

Preferred as the water-dilutable self-crosslinking components (A) are polycondensation, polymerization-, or polyaddition products as are described in the above-mentioned AT-PS Nos. 346 989 and 353 369. It is evident that resins of different constitution may be used, as long as they correspond to the criteria required by the claims with regard to their amine value and the number of chain-end or side-chain polymerizable ethylenic double bonds in 1000 molecular weight units, as expressed by the double bond number. Particularly preferred components (A) are resins based on bisphenol-A epoxy resins. These resins, in the combinations of the invention, convey optimum properties to the primers prepared therefrom as are required, for example, by the automobile industry.

Suitable components (B) according to the present invention are modified dioxazolidine- or di-perhydro-1,3-oxazine compounds carrying an average of one chain-end or side-chain ethylenic double bond per molecule. The methods for preparing such compounds are based on the fact that the methylene group lying between the nitrogen atom and the oxygen atom of the 5-membered oxazolidine ring or the corresponding 6-membered ring is activated in order that one of its hydrogen atoms reacts with an isocyanate group. In this way, besides the desired crosslinking function, a carbamide group is introduced which essentially enhances the adhesion characteristics of the cathodically deposited films.

The modified dioxazolidines useful as component (B) in the binders produced according to the present invention are obtained through reaction of dioxazolidines or di-perhydro-1,3-oxazines with unsaturated monoisocyanates. The latter are preferably used as the reaction products of equimolar quantities of a diisocyanate and a hydroxy-(meth)acrylate. The preparation of such unsaturated monoisocyanates is described, for example, in AT-PS No. 342 168. For the present invention, reaction products of toluylene diisocyanate and monoesters of (meth)acrylic acid with $C_2$-$C_4$-diols are particularly preferred.

The constitution of component (B) may be described as follows, with either the 5-membered ring (oxazolidine) or the 6-membered ring (di-perhydro-1,3-oxazine) forming. In the present invention if applicable the perhydroxy-1,3-oxazine structure is also understood as being an oxazolidine compound.

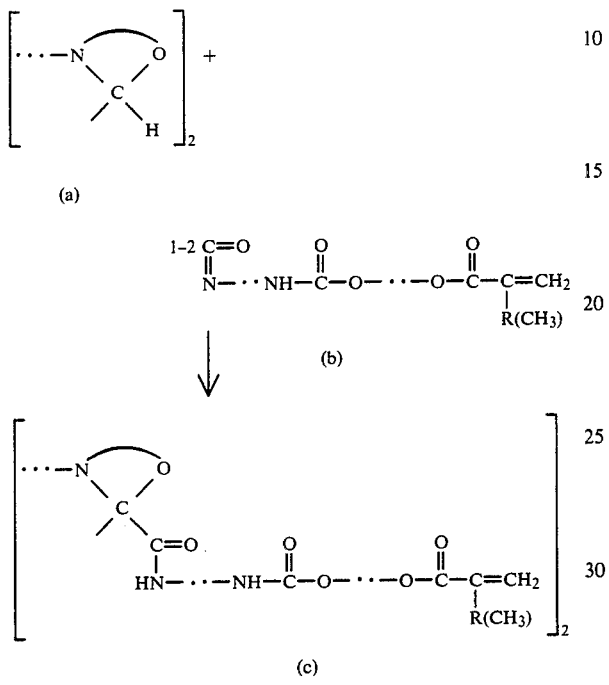

In the above formula R is hydrogen or CH₃.

The reaction is effected in order that the di-ring compound (a) is heated to from 50° to 80° C. in an inert solvent such as xylol or MIBK. The unsaturated monoisocyanate (b) is added at the indicated temperature, considering an eventual exothermic reaction, and carried to an NCO-value of below 0.1%. The final product (c), for ease of further handling, can optionally be further diluted with solvents such as glycol ethers.

The dioxazolidines or perhydro-1,3-oxazines suitable for the reaction with the monoisocyanates can be prepared in various ways as follows:

(I) Through reaction of primary diamines with 2 moles of a monoepoxy compound and with ring formation with 2 moles of an aldehyde. The desired compounds are obtained according to the following reaction mechanism:

(FORMULA I)

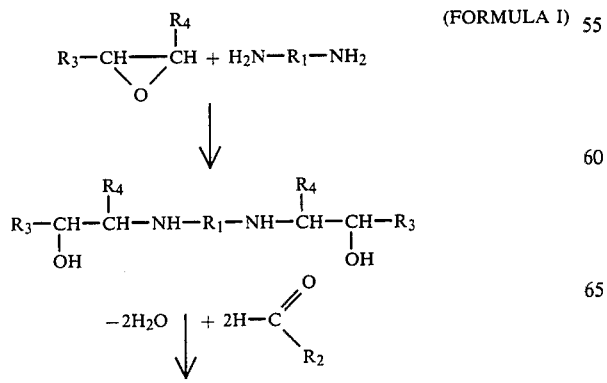

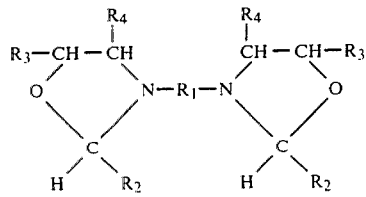

The radicals stand for the following:

$R_1$ = a straight chain or branched or cyclic alkylene radical with from 2 to 12 C-atoms or an aralkylene radical, $R_2$ = a straight chain or branched alkyl radical with from 1 to 4 C-atoms or a hydrogen atom or an aryl radical optionally substituted, $R_3$ = a saturated or unsaturated aliphatic or cycloaliphatic or aromatic hydrocarbon radical, optionally substituted with ether or ester groups, $R_4$ = H or CH₃.

In the case where the diamine is replaced by a dialkylene triamine, the secondary amino group remaining in $R_1$ is blocked with an acrylic compound, for example with an acrylate or an acrylamide, according to a MICHAEL-addition reaction.

(II) Through reaction of alkyl-amino-β- or alkyl-amino-γ-hydroxyalkyl amines with 1 mole of monoepoxide and 2 moles of aldehyde compounds are obtained according to the mechanism:

(FORMULA II)

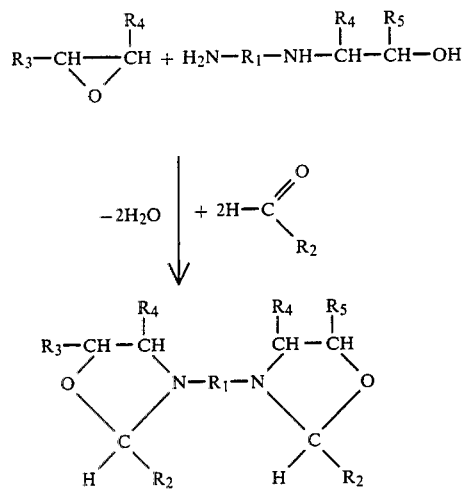

wherein $R_5$ is a hydrogen atom or an alkyl radical. When using an alkylamino-γ-hydroxyalkyl amine a 6-membered ring compound forms to provide a perhydro-1,3-oxazine structure.

(III) Another group of dioxazolidines can be formed through reaction of 2 moles of hydroxyoxazolidine, optionally substituted, with 1 mole of a diisocyanate. Examples of suitable hydroxyoxazolidines are

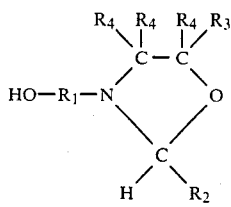
(FORMULA III A)

which are prepared by reacting a primary alkanolamine with a monoepoxy compound and an aldehyde.

When using primary-β- or γ-hydroxy-alkylamines, oxazolidines of the following formula are obtained:

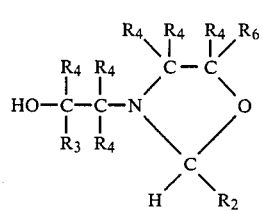
(FORMULA III B)

wherein $R_6=R_4$ or an alkyl or phenyl radical, or the corresponding 6-membered compound;

Hydroxy oxazolidines of the formula

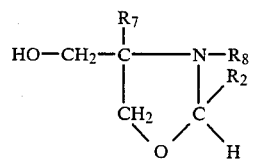
(FORMULA III C)

wherein
- $R_7$ = a hydrogen atom or a straight chain or branched or cyclic alkyl radical with from 2 to 12 C-atoms,
- $R_8$ = a radical remaining after reaction with the active hydrogen atom next to the nitrogen atom and monofunctional with regard to the acrylic or methacrylic monomers, can be obtained by reacting 2-aminopropanediol-1,3 with a (meth)acrylate in the first step and with an aldehyde in the second step.

Other hydroxyoxazolidines or the corresponding 6-membered compounds may be obtained by reacting a primary β- or γ-hydroxymonoamine, a hydroxy(meth)acrylate and an aldehyde to provide a compound with the structure

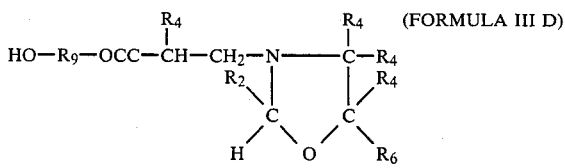
(FORMULA III D)

wherein
- $R_9$ = a straight chain or branched alkylene or polyalkylene ether radical, or may be obtained by reacting dialkanol amines and aldehydes according to formula

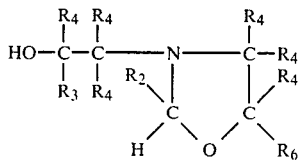
(FORMULA III E)

The hydroxyoxazolidines according to formula (III) may also be reacted with equimolar proportions of diisocyanates, monoisocyanate compounds resulting which may be reacted in a further step to give monoisocyanates reacted in a further step with diols or polyols to give di- or polyoxazolidines. It is evident that these polyoxazolidines can also be reacted with unsaturated isocyanates in accordance with the present invention. Examples of the various representatives of the mentioned compounds are listed in the examples.

The binders of the invention are prepared by blending the components at temperatures guaranteeing optimum homogenizing. The components are blended in a ratio of from 98 to 50% by weight, preferably 95 to 60% by weight, of component (A) and 2 to 50% by weight, preferably 5 to 40% by weight, of component (B). Optionally, one of the components may be used as a dispersing medium for the pigments, etc., with the other component being admixed thereafter. Upon addition of the acid necessary for neutralization in order to obtain the solubility with water, the batch is diluted with deionized water to achieve the desired application viscosity. The formulation of CED-paints and the conditions for electrodeposition are known to the expert and need no further explanation.

The cathodically deposited films are crosslinked at from 130° to 190° C., preferably 150° to 180° C. The same conditions apply to films applied in an alternative way, such as dipping or spraying, appropriate formulation of the paints being provided.

The following examples illustrate the invention without limiting its scope. Parts and percentages refer to weight, unless otherwise stated.

The following abbreviations are used in the examples:
HMDA: Hexamethylenediamine
IPDA: Isophoronediamine
TCDA: Tricyclodecanediamine
AEEA: Aminoethylethanolamine
APEA: Aminopropylethanolamine
MOLA: Monoethanolamine
MPA: Monopropanolamine
MIPA: Monoisopropanolamine
DIPA: Diisopropanolamine
AEPD: Aminoethylpropanediol
DOLA: Diethanolamine
CE: Glycidyl ester of $C_9$–$C_{11}$ monocarboxylic acids
AGE: Allylglycidylether
EHGE: 2-ethylhexylglycidylether
PGE: Phenylglycidylether
EHA: 2-ethylhexylacrylate
BUA: n-butylacrylate
HEMA: Hydroxyethylmethacrylate
HEA: Hydroxyethylacrylate
FA: Paraformaldehyde 91%
BZA: Benzaldehyde
ANA: Anisaldehyde
TDI: Toluylenediisocyanate (available isomer blend)
IPDI: Isophoronediisocyanate
HMDI: 1,6-hexamethylenediisocyanate HD: 1,6-hexanediol
PEG: Polyethyleneglycol (MW ca. 300)
TMP: Trimethylolpropane
GL: Glycerol
BA: Bisphenol-A, reacted with 2 moles of propylenedioxide
EG: Monoethyleneglycol
BMI: Basic monoisocyanate of 1 mole TDI and 1 mole diethylethanolamine
DBZ: Double bond number (number of chain-end or side-chain double bonds in 1000 molecular weight units)
BNZ: Number of basic groups in 1000 molecular weight units.

1. PREPARATION OF THE DI- AND POLYOXAZOLIDINES AND DI- AND POLY-PERHYDRO-1,3-OXAZINES USED ACCORDING TO THE INVENTION

The compositions of the intermediates used in the examples are limited in Table 1.

(a) Products according to Formulas (I) and (II)

The monoepoxy compound is added within 1 hour to the amine at from about 60° to 120° C., charged to a suitable reaction vessel (Phase 1), and reacted completely within from 1 to 3 hours at from about 90° to 130° C. (Phase 2). Upon cooling to 70° to 80° C., the aldehyde and the solvent for the solvent cook is added, preferably special white spirit with a boiling range of from 80° to 120° C. or a similar benzene hydrocarbon. The reflux temperature is held until the theoretical quantity of water has distilled off. Then the solvent is vacuum-stripped.

(b) Products according to Formulas (III A)–(III E)

Hydroxyoxazolidines are produced according to formula (III E), through reaction of the dialkanolamine with the aldehyde, using a solvent for entraining the reaction water at about 120° C. The preparation is also disclosed in European Patent Application No. 00 28 401. The preparation of the products according to formulas III A and B is carried out as described in the preparation of compounds having formulas I and II above, i.e., under (a). The ring may also be formed with a mixture of various amines, blends of various ring compounds being obtained.

In preparing the hydroxyoxazolidines according to formulas III C and III D, in the first step, the aminopropanediols or the hydroxymonoamines are reacted with the acrylate for 2 hours at from 80° to 100° C. When using methacrylates, the reaction temperature should be raised to about 140° C. Subsequently, at from 70° to 80° C., with a suitable azeotropic entraining agent, preferably special white spirit with a boiling range of from 80° to 120° C. or a similar aliphatic hydrocarbon, the carbonyl compound (and optionally the dialkanolamine) is added. The resulting reflux temperature is held until the calculated quantity of reaction water has distilled off. Then the solvent is vacuum-stripped.

The hydroxyoxazolidines prepared according to the mentioned methods are added, within 30 minutes, to the isocyanate solution in an inert solvent, preferably in ethylene-glycol monobutylether acetate; and the reaction is carried to the calculated NCO-value. The further reaction with the di- or polyols is carried out at from 30° to 60° C. to an NCO-value of substantially zero.

2. PREPARATION OF THE POLYMERIZABLE MONOISOCYANATE INTERMEDIATES

To 1 mole of the diisocyanate, charged in an isocyanate-inert solvent, such as ethylene glycol monoethylether acetate or MIBK, the hydroxyacrylate (1 mole) blended with 0.2% of hydroquinone, is added within 1 hour at 30° to 40° C. The reaction is carried to the calculated NCO-value at from 60° to 80° C. The quantity of the solvent is chosen in order that a resin with a solids content of from 50 to 80% is obtained.

The following unsaturated isocyanate intermediates are used in the examples:
UMI 1: TDI-HEA
UMI 2: TDI-HEMA
UMI 3: TDI-Hydroxypropylacrylate.

3. PREPARATION OF COMPONENTS (B) USED ACCORDING TO THE INVENTION

Table 2 lists the composition and characteristics for components (B) based on various dioxazolidines.

Component (B) is prepared in order that the dioxazolidine is dissolved in an inert solvent such as xylol, MIBK, with the solids content of Component (B) being about 80%. At from 50° to 80° C., the unsaturated isocyanate intermediate is added, considering the exothermic reaction, and the reaction is carried to an NCO-value of substantially zero. If necessary, the reaction product can be further diluted with a solvent, such as a glycol ether.

4. PROCESS OF PREPARING THE BINDER COMBINATIONS OF THE INVENTION

According to the data listed in Table 3, combinations of Components (A) and (B) are prepared, which can be diluted with water upon neutralization with the listed quantities of acid. The table also lists the pH-value of a 10%-solution. The column "Stability" lists the maximum solids content of binder in an aqueous emulsion giving stable low-viscous emulsions, starting from an 85% resin combination in an organic solvent. This feature is of particular importance for replenishing continuously operated CE coating tanks.

It is advantageous to prepare the emulsions by adding the neutralized resin solutions, while stirring, to the desired quantity of water, heated to about 60° C. In this way the content of organic solvents can be kept at a very low level (VOC-provisions).

The following products are used as self-crosslinking water-soluble component (A):

(A 1): To a reaction vessel equipped with stirrer, thermometer and reflux condensor, 1000 g of an epoxy resin based on bisphenol-A (epoxy equivalent about 500) are dissolved in 492 g of ethylene glycol monoethylether acetate (AEGLAC) at from 60° to 70° C. 0.2 g of hydroquinone and 144 g of acrylic acid are added, and the temperature is raised to 100° to 110° C. At this temperature, the reaction is carried to an acid value of below 5 mg KOH/g (DBZ=1.75). At 60° to 70° C., 652 g of BMI (70%) are added, and the batch is reacted to an NCO-value of substantially zero to provide a product having a DBZ value of 1.25 and a BNZ value of 1.1.

(A 2): 520 g of an epoxy resin based on bisphenol-A (epoxy equivalent about 260) are dissolved, as described in (A 1), in 465 g of AEGLAC and reacted with 564 g of a semiester of tetrahydrophthalic acid anhydride and hydroxyethylmethacrylate (DBZ=1.85). The reaction product is further reacted with 750 g of BMI (70%) as described in (A 1) to provide a product having a DBZ value of 1.24 and a BNZ value of 1.24.

(A 3): 1000 g of epoxy resin (epoxy equivalent about 500) is reacted, as described in (A 1), with 86.5 g of acrylic acid and 224 g of dehydrated castor oil fatty acid, and subsequently with 652 g of BMI (70%) to provide a product having a DBZ value of 0.68 and a BNZ value of 0.99.

(A 4): To a solution of 1000 g of an epoxy resin based on bisphenol-A (epoxy equivalent about 500) in 520 g of AEGLAC, 210 g of diethanolamine are added in drops within 1 hour, at from 100° to 110° C. Then the batch is heated to 150° C. and reacted for 1 additional hour. At 60° to 70° C., the product is reacted with 652 g of UMI (70%) until an NCO-value of substantially zero is obtained to provide a product having a DBZ value of 0.9 and a BNZ value of 1.20.

As will be apparent to one skilled in the art, various modifications can be made within the scope of the aforesaid description. Such modifications being within the ability of one skilled in the art form a part of the present invention and are embraced by the appended claims.

TABLE 1

| Comp | Diamine | (Di)Alkanol-amine | Aminoalkyl-alkanolamine | Monoepoxide | (Meth)acrylate | Aldehyde | Diisocyanate | Di-(Poly)ol |
|---|---|---|---|---|---|---|---|---|
| OX 1 | 116 HMDA | — | — | 480 CE | — | 66 FA | — | — |
| OX 2 | 170 IPDA | — | — | 228 AGE | — | 212 BZA | — | — |
| OX 3 | 194 TCDA | — | — | 186 EHGE | — | 66 FA | — | — |
| OX 4 | — | — | 104 AEEA | 240 CE | — | 66 FA | — | — |
| OX 5 | — | — | 118 APEA | 150 PGE | — | 212 BZA | — | — |
| OX 6 | — | 122 MOLA | — | 480 CE | — | 66 FA | 174 TDI | — |
| OX 7 | — | 150 MPA | — | 228 AGE | — | 212 BZA | 222 IPDI | — |
| OZ 8 | — | 133 DIPA 75 MIPA | — | 240 CE | — | 272 ANA | 168 HMDI | — |
| OX 9 | — | 238 AEPD | — | — | 368 EHA | 66 FA | 174 TDI | — |
| OX 10 | — | 119 AEPD 105 DOLA | — | — | 128 BUA | 212 BZA | 222 IPDI | — |
| OX 11 | — | 150 MIPA | — | — | 260 HEMA | 66 FA | 174 TDI | — |
| OX 12 | — | 150 MPA | — | — | 228 HEA | 272 ANA | 222 IPDI | — |
| OX 13 | — | 238 AEPD | — | — | 368 EHA | 66 FA | 348 TDI | 118 HD |
| OX 14 | — | 105 DOLA 61 MOLA | — | 240 CE | — | 212 BZA | 222 IPDI | 150 PEG 44 TMP |
| OX 15 | — | 150 MPA | — | — | 228 HEA | 272 ANA | 348 TDI | 59 HD 31 GL |
| OX 16 | — | 122 MOLA | — | 300 PGE | — | 66 FA | 336 HMDI | 172 BA 31 EG |

TABLE 2

| Binder | Unsaturated Monoisocyanate | Di (Tri)-Oxazolidine | Mol UMI/Mol OX | DBZ | AZ |
|---|---|---|---|---|---|
| B 1 | 522 UMI 1 | 836 OX 12 | 0.9 | 1.33 | 82 |
| B 2 | 365 UMI 3 | 404 OX 3 | 0.6 | 1.56 | 146 |
| B 3 | 486 UMI 2 | 776 OX 7 | 0.8 | 1.27 | 89 |
| B 4 | 580 UMI 1 | 998 OX 14 | 1.0 | 1.27 | 71 |
| B 5 | 365 UMI 2 | 804 OX 9 | 0.6 | 1.03 | 96 |
| B 6 | 486 UMI 3 | 620 OX 1 | 0.8 | 1.45 | 101 |
| B 7 | 456 UMI 2 | 1096 OX 13 | 0.75 | 0.97 | 72 |
| B 8 | 580 UMI 1 | 750 OX 10 | 1.0 | 1.50 | 84 |
| B 9 | 522 UMI 1 | 574 OX 2 | 0.9 | 1.64 | 102 |
| B 10 | 365 UMI 3 | 800 OX 6 | 0.6 | 1.03 | 96 |
| B 11 | 608 UMI 2 | 1052 OX 15 | 1.0 | 1.20 | 67 |
| B 12 | 290 UMI 1 | 368 OX 4 | 0.5 | 1.52 | 170 |
| B 13 | 426 UMI 2 | 608 OX 11 | 0.7 | 1.35 | 108 |
| B 14 | 547 UMI 3 | 927 OX 16 | 0.9 | 1.22 | 76 |
| B 15 | 365 UMI 2 | 444 OX 5 | 0.6 | 1.48 | 138 |

TABLE 2-continued

| Binder | Unsaturated Monoisocyanate | Di (Tri)-Oxazolidine | Mol UMI/Mol OX | DBZ | AZ |
|---|---|---|---|---|---|
| B 16 | 608 UMI 2 | 852 OX 8 | 1.0 | 1.32 | 74 |

TABLE 3

| Example No. | Resin A 100 FH | Resin B Parts FH | Neutr. (mMolacid/100 FH) | pH | Stability |
|---|---|---|---|---|---|
| 1 | A 1 | 30 B 10 | 35 | 6.2 | 40 |
| 2 | A 1 | 15 B 7 | 40 | 5.8 | 36 |
| 3 | A 1 | 20 B 12 | 35 | 6.3 | 38 |
| 4 | A 1 | 25 B 4 | 45 | 5.7 | 42 |
| 5 | A 2 | 20 B 15 | 30 | 6.2 | 44 |
| 6 | A 2 | 20 B 2 | 50 | 5.5 | 36 |
| 7 | A 2 | 25 B 6 | 45 | 5.8 | 36 |
| 8 | A 2 | 25 B 9 | 35 | 5.7 | 38 |
| 9 | A 3 | 30 B 1 | 40 | 6.0 | 42 |
| 10 | A 3 | 15 B 16 | 40 | 6.0 | 40 |
| 11 | A 3 | 20 B 5 | 45 | 5.8 | 38 |
| 12 | A 3 | 20 B 14 | 35 | 6.3 | 42 |
| 13 | A 4 | 20 B 8 | 40 | 5.7 | 38 |
| 14 | A 4 | 25 B 13 | 30 | 6.1 | 38 |
| 15 | A 4 | 25 B 3 | 35 | 5.9 | 42 |
| 16 | A 4 | 30 B 11 | 35 | 6.0 | 40 |

It is claimed:

1. Cathodically depositable synthetic resin binders, hardenable through thermal polymerization comprising (A) a modified epoxy resin component substantially water-soluble upon protonation of the basic groups, carrying basic nitrogen atoms according to an amine number of between 40 and 170 mg KOH/g and chain-end or side-chain double bonds according to a double bond number of at least 0.5 to 1000 molecular weight units (component A); and (B) a component substantially water-insoluble under the conditions of cathodic electrodeposition which is a reaction product of a hydroxy(meth)acrylate-diisocyanate-monoadduct with a oxazolidine compound or the corresponding 6-membered ring compounds (perhydro-1,3-oxazine) of the general formula

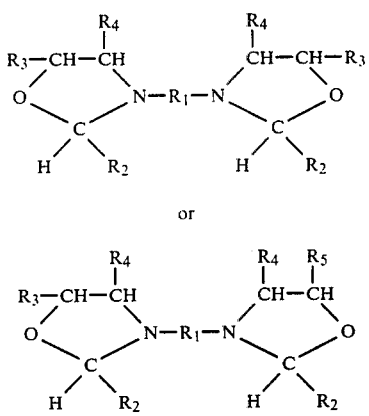

or

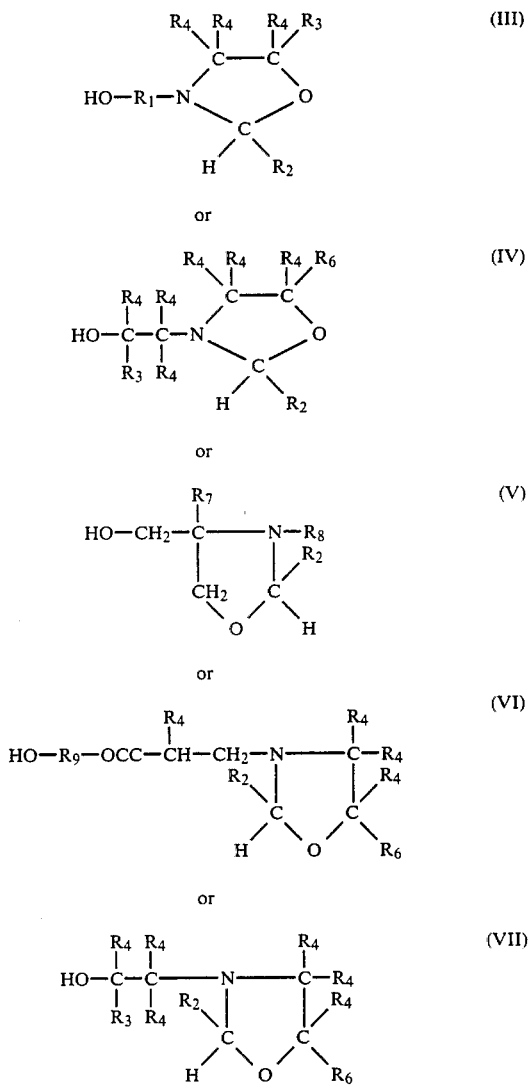

or with a reaction product of equivalent amounts of a diisocyanate with a hydroxy oxazolidine or the corresponding 6-membered ring compound of the formula wherein $R_1$ is a straight chain or branched or cyclic alkylene radical with from 2 to 12 C-atoms or an aralkylene radical, $R_2$ is a straight chain or branched alkyl radical with from 1 to 4 C-atoms or a hydrogen atom or an aryl radical, $R_3$ is a saturated or unsaturated aliphatic or cycloaliphatic or aromatic hydrocarbon radical, $R_4$ is H or $CH_3$, $R_5$ is a hydrogen atom or an alkyl radical, $R_6$ is equal to $R_4$ or an alkyl or phenyl radical, $R_7$ is a hydrogen atom or a straight chain or branched or cyclic alkyl radical with from 2 to 12 C-atoms, $R_8$ is the moiety remaining after reaction with the active hydrogen atom next to the nitrogen atom and monofunctional with regard to the acrylic or methacrylic monomers, and $R_9$ is a straight chain or branched alkylene or polyalkylene ether radical, and whereby in the component (B) the moiety derived from the hydroxy(meth)acrylate on an average is present at least once per molecule.

2. The resin binders according to claim 1 wherein the double bond number in component (A) is from about 0.8 to 2.5 for 1000 molecular weight units.

3. The resin binders according to claim 1 wherein component (A) is the reaction product of an epoxy resin based on bisphenol-A.

4. The resin binders according to claim 1 wherein component (B) is obtained through reaction of oxazolidine or perhydro-1,3-oxazine compounds with unsaturated monoisocyanate compounds carrying one chain-end or side-chain ethylenic double bond.

5. The resin binders according to claim 3 wherein the unsaturated monoisocyanate compound is the reaction product of a diisocyanate and hydroxy(meth)acrylate.

6. The resin binders according to claim 5 wherein the diisocyanate is toluylene diisocyanate.

7. The resin binders according to claim 1 wherein components (A) and (B) are used in a weight ratio of from 98 to 50% of component (A) and of from 2 to 50% of component (B).

8. The resin binders according to claim 1 wherein components (A) and (B) are used in a weight ratio of from 95 to 60% of component (A) and from 5 to 40% of component (B).

9. Coating compositions suitable for electrodeposition comprising a binder according to claim 1.

10. Coating compositions suitable for electrodeposition comprising a binder according to claim 2.

11. Coating compositions suitable for electrodeposition comprising a binder according to claim 3.

12. Coating compositions suitable for electrodeposition comprising a binder according to claim 4.

13. Coating compositions suitable for electrodeposition comprising a binder according to claim 6.

14. Coating compositions suitable for electrodeposition comprising a binder according to claim 8.

15. The process for preparing coating compositions utilizing the binders of claim 1 wherein component (B) is used as a medium for preparing a pigment paste, and component (A) is thereafter added to said pigment paste as a clear varnish to provide finished coating composition.

16. The process for preparing coating compositions utilizing the binders of claim 2 wherein component (B) is used as a medium for preparing a pigment paste, and component (A) is thereafter added to said pigment paste as a clear varnish to provide a finished coating composition.

17. The process for preparing coating compositions utilizing the binders of claim 3 wherein component (B) is used as a medium for preparing a pigment paste, and component (A) is thereafter added to said pigment paste as a clear varnish to provide a finished coating composition.

18. The process for preparing coating compositions utilizing the binders of claim 4 wherein component (B) is used as a medium for preparing a pigment paste, and component (A) is thereafter added to said pigment paste as a clear varnish to provide a finished coating composition.

19. The process for preparing coating compositions utilizing the binders of claim 6 wherein component (B) is used as a medium for preparing a pigment paste, and component (A) is thereafter added to said pigment paste as a clear varnish to provide a finished coating composition.

20. The process for preparing coating compositions utilizing the binders of claim 8 wherein component (B) is used as a medium for preparing a pigment paste, and component (A) is thereafter added to said pigment paste as a clear varnish to provide a finished coating composition.

* * * * *